July 26, 1938.  G. F. RYAN  2,124,591
CUTTING DIE
Filed Oct. 31, 1934
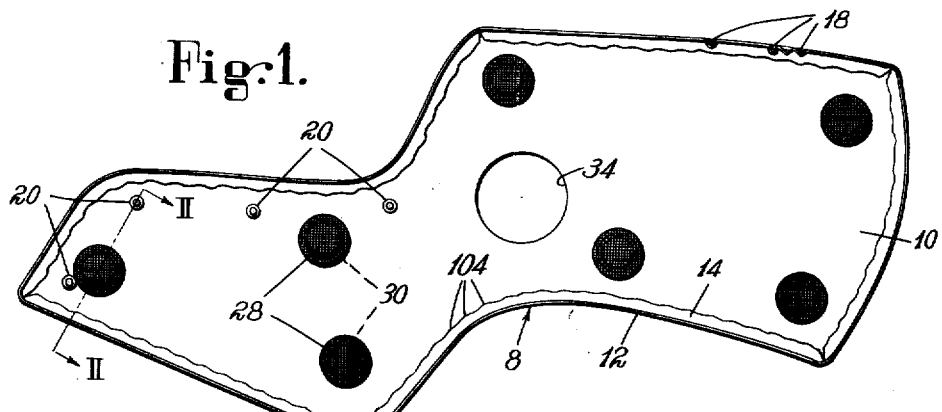
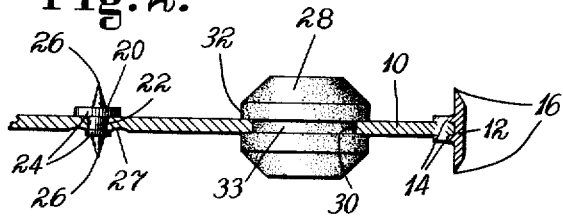
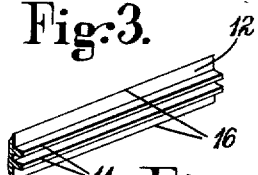
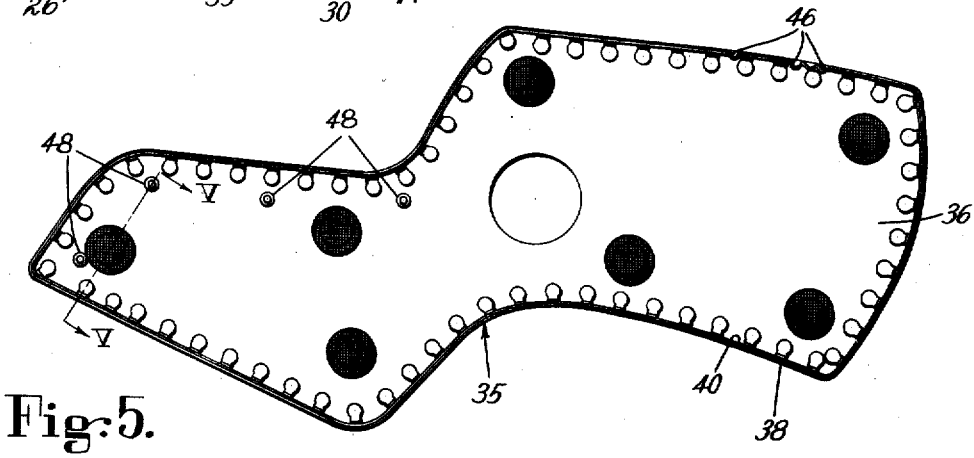
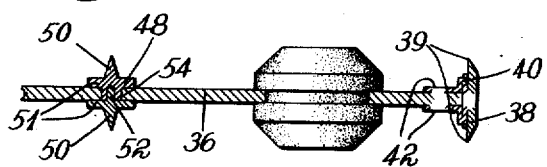
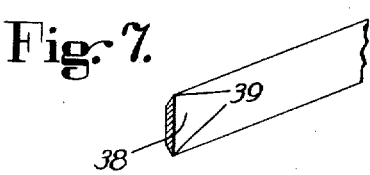

Patented July 26, 1938

2,124,591

UNITED STATES PATENT OFFICE 2,124,591

CUTTING DIE

George F. Ryan, Lynn, Mass., assignor to United Shoe Machinery Corporation, Paterson, N. J., a corporation of New Jersey Application October 31, 1934, Serial No. 750,861

15 Claims. (Cl. 164—29)

This invention relates to dies and is herein illustrated as embodied in a die for producing shoe part blanks from sheet material such as leather. The method of producing dies of the type herein illustrated is disclosed and claimed in a divisional application Serial No. 44,741, filed October 12, 1935.

In the manufacture of shoes it has heretofore been customary to produce shoe parts, such as vamps or quarters which when assembled form the uppers of shoes, either by machine or by hand. In the machine operation it is ordinarily the practice to make use of a metal die which is forced through sheet material by means of a clicking machine or press, thereby to form a blank. In the hand operation it is customary to make use of a shoe part pattern which is used as a guide for a knife which is run around the periphery of the pattern to form a blank. The machine operation is employed in most shoe factories in instances where a run of shoes of a given style to be produced is reasonably large. Some shoe factories, however, heretofore have found it more economical to use the hand cutting operation thereby avoiding the greater initial cost of dies as compared with patterns. This has been true particularly, for example, in factories which make lines of shoes which are subject to frequent style changes or in which for any reason the run of shoes is likely to be small. The patterns customarily employed in carrying out the hand cutting operation, while costing less than corresponding dies for use in clicking machines, nevertheless involve a very substantial portion of the expense incurred in the cutting of parts which form the shoe upper.

In view of the foregoing, it is an object of the present invention to provide an improved die by means of which such economies in the manufacture and operation of cutting dies can be effected as to make it feasible to utilize dies in producing shoe parts even in such cases as those in which the run of shoes is small thus making it possible to eliminate to a large extent the employment of hand cutting methods. To this end, and as illustrated, the invention provides a die having a core preferably composed of sheet metal the periphery of which corresponds substantially to the outline of a shoe part to be cut and a light cutting blade bent about the core and permanently secured thereto. Preferably and as shown, the means for securing the cutting blade to the core comprises members molecularly united with the blade and core. Preferably too, the cutting blade is provided with oppositely disposed cutting edges so arranged as to extend beyond the faces of the core upon opposite sides thereof, thus forming a double-edged die suitable for operation upon sheet material in forming either "lefts or rights" of the shoe part to be died out.

Dies constructed as above outlined are advantageous in that they are light in construction with the result that they can be readily handled but at the same time are sufficiently rigid to withstand the hard usage to which they are subjected by the presser member of a machine utilized for forcing the die through sheet material in producing blanks. In addition to the advantages enumerated, such dies can readily be assembled with the result that the cost of producing them is not disproportionately greater than the cost of producing patterns of the type aforementioned, thus making it feasible to utilize cutting dies in a comparatively rapid machine operation even though the number of shoe parts to be produced is small.

Other features of the invention will be apparent from the following detailed description when taken in connection with the accompanying drawing and will be pointed out in the claims.

Fig. 1 is a plan view of a cutting die embodying one form of my invention;

Fig. 2 is a cross-section on an enlarged scale taken along lines II—II of a portion of the die illustrated in Fig. 1;

Fig. 3 is a perspective view of a portion of the cutting blade of the die of Fig. 1;

Fig. 4 is a plan view of a modified form of die embodying my invention;

Fig. 5 is a cross-section on an enlarged scale taken along the line V—V of Fig. 4;

Fig. 6 is a perspective view of an intermediate strip for securing the blade to the core of the die shown in Fig. 4; and Fig. 7 is a perspective view of a portion of the blade forming part of the die shown in Fig. 4;

As shown in Fig. 1, the preferred form of die 8 comprises a sheet metal plate or core 10 shaped to correspond in outline to that of a shoe part blank such as a quarter to be produced by the die, and having secured thereto a double edged blade 12. The blade 12 is formed of a thin strip or ribbon of rolled or milled annealed steel stock which, as shown in Fig. 3, has flanges 14 projecting laterally from the central portions thereof and spaced apart by the thickness of the core 10. The stock is bent along the periphery of the core and permanently secured thereto with its body portion normal to the faces of the core by spot-welding the flanges to the faces, thus forming a rigid construction especially adapted to prevent distortion of the blade by forces acting laterally thereof. The edge portions of the blade are beveled to produce oppositely disposed cutting edges 16 which lie in parallel planes thus constituting cutting members shaped respectively to produce "left" and "right" blanks of corresponding outlines. This construction makes it possible to utilize a single die for cutting right and left blanks for a given shoe part, thereby reducing the cost of equipment, as well as contributing to efficiency in the cutting operation by reducing the number of dies to be handled.

To provide for the marking of sizes upon the cutting blanks the cutting blade 12 is nicked or crimped along its cutting edge as indicated by reference character 18.

The die is also provided with prick markers or stabs for the purpose of indicating the relation of certain portions of the blank to other parts of the shoe in which it is to be assembled. To this end, the die is provided with stabs 20, each of which comprises a frusto-conical shank 22 adapted to be inserted in a perforation in the core 10 and two flanges 24 adapted to engage opposite faces of the core and having projecting therefrom points or markers 26. Each stab is secured in position in the core by upsetting the material surrounding the shank to form a shoulder 27 which engages and holds the frusto-conical shank.

Means is provided for stripping cut blanks from the die. As illustrated in Figs. 1 and 2 this means comprises a plurality of stripping members in the form of rubber plugs 28 located in openings 30 in the core. The body portion 32 of each of the plugs 28 is substantially cylindrical and is slit midway of its ends as indicated at 33 so that when the plug is forced into an opening 30 the material of the core surrounding the opening enters the split portion 33 of the plug. This construction provides adequate means for supporting the plugs and maintaining them in position without the use of any additional parts and facilitates their assembly in the die. Each plug is so shaped that its end portions extend slightly beyond the planes of the cutting edges 16 on opposite sides of the core 10 with the result that in the operation of the die upon sheet material the end portions of the plugs are forced toward the core during the application of pressure but when the pressure is released the plugs will return to their normal shape, thus forcing out a cut blank from the interior of the die. During location of the die upon the work the plugs 28 support the cutting edges adjacent to the work above the same thus reducing likelihood of marring the surface of the work. Further to assist the operator in removing blanks from the die there is provided a circular opening 34 through which the operator may thrust a finger in grasping a blank. The opening 34 may also be used to facilitate picking up the die without touching the cutting edges.

In Figs. 4 and 5 there is illustrated a modified form of die 35 comprising a core 36, a cutting blade 38, extending along the periphery of the core and preferably welded to an intermediate strip 40 which is in turn welded to the core. The blade in this instance is preferably composed of annealed steel stock in the form of a thin ribbon as shown in Fig. 7, and having cutting edges 39. The intermediate strip 40 (Fig. 6) is preferably of thin sheet metal having lugs 42 formed integrally therewith and extending from opposite margins of the intermediate strip. These lugs are bent inwardly and are arranged to engage opposite faces of the core along the periphery thereof. By welding the blade 38 to the strip 40 and then welding the lugs 42 to the core 36 a rigid die construction is produced in that the cutting blade is rigidly and permanently secured to the core at frequent intervals along its periphery, the lugs serving to prevent distortion of the blade laterally and operating to maintain the blade in substantially perpendicular relation to the faces of the core.

The die is supplied with marking devices in the form of nicks 46 and with stabs 48. The stabs 48, which are somewhat different in construction from the stabs 20, comprise two conical members 50 having flanges 51 in engagement with opposite faces of the core 36. One of the flanges has a projection 52 adapted to be forced into a sleeve 54 in the other portion and positioned in an opening in the core, thus to secure the stabs in position in engagement with opposite faces of the core 36.

In the use of the dies above described such a die is placed upon sheet material in a press with one of the cutting edges, for example, the lowermost cutting edge 16 of the die as shown in Fig. 2, slightly spaced from the material by the plugs 28. The presser member of the machine is then brought down upon the uppermost cutting edge to force the die through the material to produce a "left" blank, which is stripped from the die by the plugs 28 upon removal of the pressure. To produce a "right" blank the die is merely reversed and the operation repeated.

Having described my invention, what I claim as new and desire to secure by Letters Patent of the United States is:

1. A cutting die comprising a sheet metal plate an edge of which corresponds in shape to the outline of a blank to be produced, and a cutting blade extending along the edge of the plate and having spaced flanges integral with the blade and welded to opposite faces of the plate.

2. A cutting die comprising a sheet metal core corresponding in shape to a blank to be produced, a cutting blade having two spaced flanges projecting from the body portion of the blade and embracing edge portions of the core, and means for securing the flanges to the core.

3. A cutting die comprising a flat metal core, a cutting blade formed of a comparatively thin metal strip extending along the periphery of the core and having flanges spaced heightwise of the strip and embracing edge portions of the core, and means for securing the flanges to the core.

4. A cutting die comprising a flat metal core, a cutting blade consisting of a strip of comparatively thin metal extending along the periphery of the core and having a body portion terminating in oppositely disposed cutting edges, flanges integral with the strip and spaced heightwise thereof between the cutting edges, and means for securing the flanges to opposite faces of the core.

5. A die comprising a core, a cutting blade extending along the periphery of the core, and means for securing the blade to the core comprising a metal strip welded to the blade and extending along the periphery of the core between the core and the blade, and projections forming part of the strip welded to opposite faces of the core.

6. A die comprising a core of sheet metal, a strip of metal extending along the periphery of the core substantially at right angles thereto and having laterally projecting lugs spaced along the periphery of the core and secured to opposite faces of the core, and a cutting blade secured to the strip.

7. A die comprising a core, a rim extending along the periphery of the core substantially at right angles thereto, members projecting laterally from the rim for securing the rim to the core, a cutting blade, and means for securing the cutting blade to the rim.

8. A die comprising a core, a rim formed by a strip of metal extending along the periphery of the core and having laterally extending spaced lugs engaging opposite faces of the core and welded thereto, and a cutting blade engaging the rim and welded thereto.

9. A cutting die comprising a core, a blade secured to the core, and a marking member carried by the core, said marking member comprising a shank positioned in an opening in the core, flanges engaging the faces of the core to prevent displacement of the marking member, and pointed members projecting from the flanges upon opposite sides of the core.

10. A cutting die comprising a core, a cutting blade secured to the core, and a marking device comprising a pointed member having a flange engaging a face of the core and a sleeve extending into an opening in the core, and a second pointed member having a flange engaging the opposite face of the core and a projection snugly fitting the sleeve for securing the pointed members together.

11. A cutting die comprising a sheet metal core having an opening therein, a blade secured to the core, a marking device comprising a frusto-conical shank positioned in the opening, the material of the core being upset adjacent to the opening to engage and hold the shank, flanges at the ends of the shank engaging opposite faces of the core, and a pointed member extending from each of the flanges.

12. A cutting die comprising a core, a blade extending along the periphery of the core and having cutting edges projecting beyond opposite faces of the core, and a blank stripping member carried by the core and extending beyond the cutting edges on opposite sides of the core.

13. A cutting die comprising a core, a double edged blade extending along the edges of the core and projecting beyond opposite faces thereof, and a yieldable member mounted in an opening in the core and having portions which project beyond oppositely disposed edges of the blade.

14. A cutting die comprising a core of sheet material and having an opening therein, a cutting blade extending along edge portions of the core, and a blank stripping member comprising a rubber plug having a peripheral slit between its ends and located in the opening with portions of the core extending into the slit.

15. A cutting die comprising a core of sheet material having openings therein, a double edged cutting blade secured to the core along edge portions thereof, and rubber plugs positioned in the openings and having their opposite extremities extending beyond the planes of the edges of the blade upon opposite sides of the core.

GEORGE F. RYAN.

CERTIFICATE OF CORRECTION.

Patent No. 2,124,591.     July 26, 1938.

GEORGE F. RYAN.

It is hereby certified that error appears in the printed specification of the above numbered patent requiring correction as follows: Page 3, second column, line 12, claim 12, after "extending" insert the words completely through the core and; and line 13, same claim, for "of the core" read thereof; and that the said Letters Patent should be read with this correction therein that the same may conform to the record of the case in the Patent Office.

Signed and sealed this 6th day of December, A. D. 1938.

Henry Van Arsdale (Seal)     Acting Commissioner of Patents.

the core substantially at right angles thereto and having laterally projecting lugs spaced along the periphery of the core and secured to opposite faces of the core, and a cutting blade secured to the strip.

7. A die comprising a core, a rim extending along the periphery of the core substantially at right angles thereto, members projecting laterally from the rim for securing the rim to the core, a cutting blade, and means for securing the cutting blade to the rim.

8. A die comprising a core, a rim formed by a strip of metal extending along the periphery of the core and having laterally extending spaced lugs engaging opposite faces of the core and welded thereto, and a cutting blade engaging the rim and welded thereto.

9. A cutting die comprising a core, a blade secured to the core, and a marking member carried by the core, said marking member comprising a shank positioned in an opening in the core, flanges engaging the faces of the core to prevent displacement of the marking member, and pointed members projecting from the flanges upon opposite sides of the core.

10. A cutting die comprising a core, a cutting blade secured to the core, and a marking device comprising a pointed member having a flange engaging a face of the core and a sleeve extending into an opening in the core, and a second pointed member having a flange engaging the opposite face of the core and a projection snugly fitting the sleeve for securing the pointed members together.

11. A cutting die comprising a sheet metal core having an opening therein, a blade secured to the core, a marking device comprising a frusto-conical shank positioned in the opening, the material of the core being upset adjacent to the opening to engage and hold the shank, flanges at the ends of the shank engaging opposite faces of the core, and a pointed member extending from each of the flanges.

12. A cutting die comprising a core, a blade extending along the periphery of the core and having cutting edges projecting beyond opposite faces of the core, and a blank stripping member carried by the core and extending beyond the cutting edges on opposite sides of the core.

13. A cutting die comprising a core, a double edged blade extending along the edges of the core and projecting beyond opposite faces thereof, and a yieldable member mounted in an opening in the core and having portions which project beyond oppositely disposed edges of the blade.

14. A cutting die comprising a core of sheet material and having an opening therein, a cutting blade extending along edge portions of the core, and a blank stripping member comprising a rubber plug having a peripheral slit between its ends and located in the opening with portions of the core extending into the slit.

15. A cutting die comprising a core of sheet material having openings therein, a double edged cutting blade secured to the core along edge portions thereof, and rubber plugs positioned in the openings and having their opposite extremities extending beyond the planes of the edges of the blade upon opposite sides of the core.

GEORGE F. RYAN.

CERTIFICATE OF CORRECTION.

Patent No. 2,124,591.  July 26, 1938.

GEORGE F. RYAN.

It is hereby certified that error appears in the printed specification of the above numbered patent requiring correction as follows: Page 3, second column, line 12, claim 12, after "extending" insert the words completely through the core and; and line 13, same claim, for "of the core" read thereof; and that the said Letters Patent should be read with this correction therein that the same may conform to the record of the case in the Patent Office.

Signed and sealed this 6th day of December, A. D. 1938.

Henry Van Arsdale (Seal)  Acting Commissioner of Patents.